United States Patent [19]

Macken

[11] Patent Number: 4,897,848
[45] Date of Patent: Jan. 30, 1990

[54] DISCHARGE DRIVEN PRECIOUS METAL CATALYST WITH APPLICATION TO CARBON MONOXIDE LASERS

[76] Inventor: John Macken, 3300 Coffey La., Santa Rosa, Calif. 95401

[21] Appl. No.: 235,363

[22] Filed: Aug. 23, 1988

Related U.S. Application Data

[63] Continuation-in-part of Ser. No. 150,023, Jan. 29, 1988, abandoned.

[51] Int. Cl.$^4$ .................................................. H01S 3/22
[52] U.S. Cl. ........................................ 372/59; 372/87; 372/89
[58] Field of Search ................. 372/59, 98, 92, 87, 372/83, 89, 55, 61, 58, 81, 34

[56] References Cited

U.S. PATENT DOCUMENTS

| | | | |
|---|---|---|---|
| 4,547,886 | 10/1985 | Kaminski et al. | 372/59 |
| 4,651,324 | 3/1987 | Prein et al. | 372/59 |
| 4,755,999 | 7/1988 | Macken | 372/87 |
| 4,756,000 | 7/1988 | Macken | 372/59 |
| 4,757,512 | 7/1988 | Macken | 372/59 |

FOREIGN PATENT DOCUMENTS

| | | | |
|---|---|---|---|
| 1256398 | 12/1971 | United Kingdom | 372/59 |
| 2028571 | 3/1980 | United Kingdom | 372/59 |
| 2083944 | 3/1982 | United Kingdom | 372/59 |
| 2107109 | 4/1983 | United Kingdom | 372/59 |

OTHER PUBLICATIONS

Lamb et al., "Contributions . . . Service, U.S.A.", The Journal of Industrial and Engineering Chemistry; 03/1920; pp. 213–223.
Willis et al.; "Sealed Tea $CO_2$ Lasers . . . Chemistry"; Appl. Phys. Lett., vol. 31, No. 2; 07/15/1977; pp. 84–85.
Willis; "Catalytic Control . . . Tea $CO_2$ Lasers"; J. Appl. Phys., vol. 50, No. 4; 04/1979; pp. 2539–2543.
Sorem et al.; "Catalytic Converters . . . $CO_2$ Tea Lasers"; Rev. Sci. Instrum., vol. 52, No. 8; 08/1981; pp. 1193–1196.
Ashurly et al.; "Catalytic Regeneration . . . $CO_2$ Laser"; Sov. J. Quantum Electron., vol. 11, No. 11; 11/1981; pp. 1477–1480.
Stark et al.; "A Sealed 100-Hz $CO_2$ . . . Catalysts"; J. Phys. E: Sci. Instrum., vol. 16; 1983; pp. 158–160.

*Primary Examiner*—Frank Gonzalez
*Attorney, Agent, or Firm*—Larry D. Johnson

[57] ABSTRACT

The performance of a carbon monoxide laser is improved by coating the walls of the surface facing the discharge with a precious metal chosen from the group consisting of gold, silver, platinum, palladium, rhodium and iridium. The precious metal coating is configured into segments which do not interfere with the electrical discharge.

6 Claims, 1 Drawing Sheet

DISCHARGE DRIVEN PRECIOUS METAL CATALYST WITH APPLICATION TO CARBON MONOXIDE LASERS

CROSS REFERENCE TO RELATED APPLICATION

This application is a continuation-in-part of U.S. patent application Ser. No. 150,023 entitled "Discharge Driven Precious Metal Catalyst with Application to CO2 Lasers," filed Jan. 29, 1988 by the author herein (now abandoned).

BACKGROUND OF THE INVENTION

The background of the invention will be discussed in two parts.

1. Field of the Invention

This invention relates to catalysts and to carbon monoxide lasers. More particularly, it relates to a method and apparatus for improving carbon monoxide lasers by catalytic or reflective optical means.

2. Description of Prior Art

Since the carbon monoxide laser was invented, it has suffered from operational problems which have prevented it from becoming widely used. The carbon monoxide laser operates best at cryogenic temperatures. This presents obvious practical and economic problems. Operation at near ambient temperature is achieved with a loss of output power and an increase in difficulty. This increase in difficulty includes the requirement for the use of expensive xenon, increased stability problems in the electrical discharge, and a reduction in optical gain. At both cryogenic and ambient temperature, it has been found that an addition of a small amount of oxygen to the gas mixture is desirable. Without the oxygen, the following chemical decomposition is evident:

$$CO + e \rightarrow C + O + e$$

where "e" is an electron

Evidence for this can be seen by the collection of carbon on the inside wall of the discharge tube. Also, discharge instabilities are in evidence. The addition of xenon and oxygen to the carbon monoxide, nitrogen and helium gas mix has improved the laser performance, but still not to the point that carbon monoxide lasers have achieved only very limited use compared to the $CO_2$ laser.

This invention teaches a way of improving the laser output power, efficiency, and lifetime of carbon monoxide lasers.

SUMMARY OF INVENTION

The performance of a carbon monoxide laser is improved by coating the walls of the surface facing the discharge with a precious metal chosen from the group consisting of gold, silver, platinum, palladium, rhodium and iridium. The precious metal coating is configured into segments which do not interfere with the electrical discharge. The coating can increase the output power of the carbon monoxide laser by two possible mechanisms.

A. The precious metal coating can catalytically alter the chemical composition of the gas in the discharge. This can have the benefit of increased discharge stability and reduced poisoning components.

B. The precious metal can be highly reflective surface. This can increase laser power by reducing diffraction loss, and trapping beneficial radiation in the discharge cavity.

In the preferred embodiment, gold coats most of the wall surface area facing the discharge. The gold is broken into multiple, electrically isolated islands.

DESCRIPTION OF THE PREFERRED EMBODIMENTS

Figure 1:
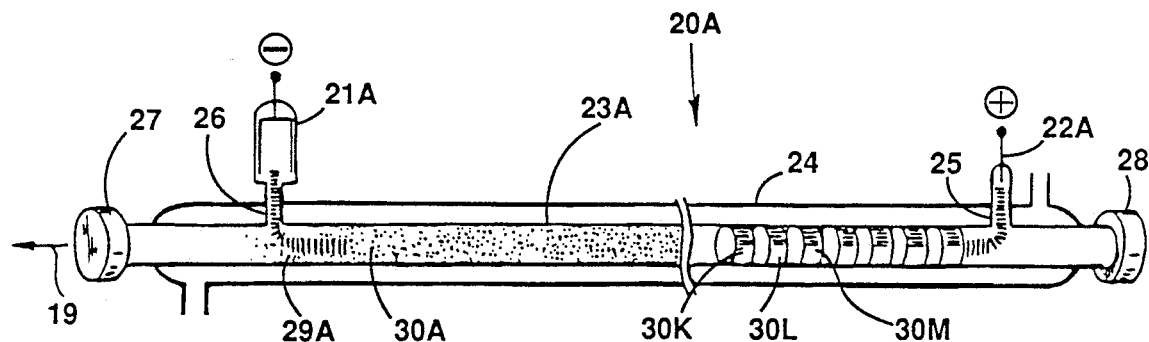
FIG. 1 is a side view perspective drawing of a tube type carbon monoxide laser broken into two sections to demonstrate two different placements of the precious metal.

In the following discussion of the figures, it should be understood that there are parts in the two figures depicted which perform analogous functions. Therefore, when it is important to understand the analogy, the numbering of the parts will be similar (30A, 30C, 30K, etc.). FIG. 1 illustrates two ways of implementing the use of a precious metal catalyst. In FIG. 1, 20A is a representation of a $CO_2$ laser which can either be considered sealed off or slowly flowing gas (pump not shown). In FIG. 1, the cathode 21A and anode 22A are connected to a source of electrical power (not shown). The laser has an inner tube 23A surrounded by an outer tube 24. Water or other cooling fluid is flowed through the space between tubes 23A and 24. Tube 26 connects cathode 21A to tube 23A, while tube 25 connects anode 22A to tube 23A laser resonator. Mirrors 27 and 28 positioned at the end of tube 23A. A laser gas mixture, such as CO, $N_2$, and He (perhaps Xe, $O_2$ or $CO_2$ also) is inside the closed envelope or cavity formed by tubes 23A, 25, 26 and mirrors 27, 28.

When electrical power is applied to electrodes 21A and 22A, a discharge 29A is formed through tube 23A. The electrical dicharge is only partly shown in FIG. 1 to avoid confusion with the illustration of the catalyst. In FIG. 1, the amplification volume would be the portion of tube 23A between the points of connection for tubes 26 and 25. This is the volume containing both the discharge and the laser beam. Specifically, the amplification volume does not include 21A, 25 or 26 in FIG. 1. The cathode and connecting tubes contain a discharge, but this discharge is not swept out by the laser beam. Similarly, the portion of the tube in front of mirrors 27 and 28 contain a laser beam, but no discharge.

To obtain a beneficial effect, it is necessary to distribute clean precious metal chosen from group consisting of gold, silver, platinum, palladium, rhodium and iridium on the inside walls of tube 23A facing the amplification volume. In FIG. 1, rings 30K, 30L, 30M represent precious metal rings or coatings which are separated. Since these metals are electrical conductors, the precious metal is broken up into multiple electrically isolated islands to prevent the discharge from deviating from the gas and passing through the precious metal.

The dielectric walls, for example, glass, of the CO laser depicted in FIG. 1 provide both mechanical support and electrical insulation for the precious metal islands (30K, 30L, 30M, etc.). The precious metals are good conductors of electricity. However, in the laser, this ability to conduct electricity must not result in the electrical current passing through the precious metal rather than through the gas to form a discharge. Passage of the current through the precious metal would decrease or eliminate laser action depending on the geometry. The electric field associated with discharge 29A in FIG. 1 is parallel to the axis of tube 23A in the amplification volume.

Since the cathode drop for precious metals is about 450 volts in a CO gas mixture, a discharge once established in the gas, will not pass through the precious metal if individual metal islands are divided into pieces small enough that the electric field voltage gradient across individual electrically conducting islands is less than the cathode voltage drop (450 V). The voltage gradient in a discharge depends on many factors, but a typical voltage gradient would be about 125 V/cm. In this example, the precious metal islands shoul be made shorter than 3.6 cm in the direction of the electric field gradient (parallel to the tube axis) to avoid this undesirable discharge deviation. However, in practice, it is desirable to make the islands much smaller than this limit. In the preferred embodiment, the islands would have a length in the direction of the electric field gradient, such that the said length is less than the distance which exhibits a 150 volt differential in the discharge. In addition to the electrical requirements to break up the precious metal, the precious metal coating also must satisfy optical requirement. In one embodiment, the optical properties of the precious metal are absorbing to prevent unwanted stray reflection lasing. However, in the preferred embodiment, the precious metal forms specularly reflecting islands. These two alternatives will be discussed in detail later.

The precious metal deposits, for example, could be coated on the inside of the tube by sputtering or thermal vapor deposition of a precious metal on the inside of the tube. The sputtering method could use a cathode made of the precious metal which can be slowly translated through the tube while an electric discharge sputters the precious metal onto the wall. Another alternative is vapor deposition using techniques well known to those skilled in the art involving a heated refractory metal boat containing the precious metal. It is well known to those skilled in the art that there are many other methods for coating precious metals. These include chemical deposition which can result from thermal decomposition of metallic salts or organo-metallic compounds. The exact method of deposition is not critical. The necessary gaps can be made using a mechanical means, such as springy metal masking rings for preventing the precious metal from reaching the tube in these areas. These metal masking rings could be removed after the precious metal coating process to leave portions of the glass wall. The preferred method, is to coat the entire inside of a glass laser tube with gold, then mechanically remove portions of the gold using a scraper which rubs off a small part of the gold. This method works well with gold because gold films on glass (deposited both by sputtering and chemical means) can be cleanly removed by abrasion. The scraper can be an aluminum rod with two springy metal wire "whiskers" protruding radially from the end of the aluminum rod. This rod can be rotated and translated through the gold coated tube providing breaks which divide the gold coating into diamond shaped islands, perhaps 6 mm long. Breaks, such as depicted in FIG. 1 between 30K, L, M etc. could be made by rotating the rod for at least one revolution without any translation of the rod. Then the rod would be translated a distance equal to approximately ½ tube diameter and the process repeated again. The metal "whiskers" would make breaks which are much narrower in width.

Rings 30K, L, M, etc. in FIG. 1 could also represent coiled sheets of springy metal, such as brass or stainless steel which were coated by the precious metal. These could be held in place by friction due to the spring tension in the metal. The coiled metal rings permit easy loading from the end of the tube. In this case, the precious metal is still depending on the dielectric for mechanical support and electrical insulation even though the precious metal is not deposited directly on the dielectric.

Another alternative is illustrated in the other half of tube 23A in FIG. 1. The coating 30A is depicted as consisting of many fine dots. This is meant to represent precious metal coating which is divided on a microscopic scale so that there is no electrical conduction along the surface. This coating appears continuous to the eye, although it may not be a mirror surface. Typically, this type of surface can result from some chemical coating methods or by heating a coated substrate to a temperature which caused the precious metal coating to break apart forming microscopic islands. This process is particularly useful when the dielectric material is ceramic which can withstand high heating temperatures. Microscopically divided gold films have been made by heating gold coated ceramic to an elevated temperature, perhaps, about 800° C. Microscopically divided gold films have been made in this way to have many different colors, such as pink, blue, brown and gold. Microscopically divided platinum or palladium coatings have also been prepared on ceramic by coating the ceramic with platinum or palladium salts and thermally decomposing the salt at high temperatures to leave the metal. Those skilled in the art know of many methods of coating gold, silver, platinum, palladium, iridium or rhodium onto surfaces. This is an ancient art and does not need further elaboration. In preparing a microscopically divided coating, the divisions result from the coating process, while in a macroscopically divided catalyst, such as 30K, 30L, 30M, etc.; the divisions are usually the results of an extra mechanical step.

Figure 2:
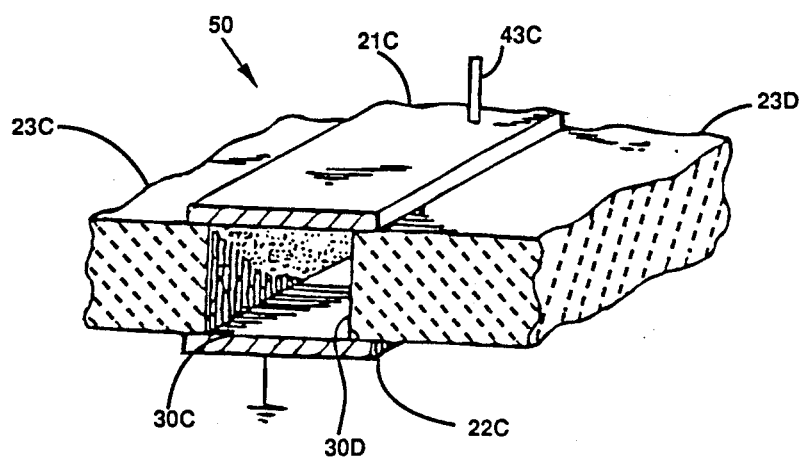
FIG. 2 is a perspective cross-section view of a carbon monoxide laser in a square or rectangular cavity showing placement of the precious metal.

The inclusion of, at least, one gap between the cathode and anode is essential. Multiple gaps are essential if the voltage gradient across the region containing the precious metal catalyst exceeds 450 V. Therefore, the question arises: how much area should be covered with precious metal? The ideal is to cover as much of the area facing the amplification volume as possible. However, in some cases acceptable good performance is still obtained when only 15% of the dielectric wall area is covered provided that the precious metal catalyst is strategically distributed along the length of the amplification volume taking into account diffusion rates and gas flow rates. If the wall is rough or irregular so that a smooth surface would have considerably less surface area, then at least 15% of the projected smooth surface area should be covered. FIG. 2 is a cross section of a portion of an RF waveguide laser. The mirrors similar to 27 and 28 are not shown in this view. This figure can also be used to illustrate the preferred embodiment for any square or rectangular cavity with a transverse discharge. For example, this would include a high aspect ratio rectangular cavity, such as described in this author's U.S. Pat. No. 4,755,999 entitled "Laser Apparatus Utilizing a Magnetically Enchanted Electrical Discharge." In FIG. 2, plates 21C and 22C are electrodes.

For a waveguide laser, these are depicted as flat metal plates which are electrically driven through terminal 43C and the electrical ground. Plate 22C is connected to ground as shown. However, it is to be understood that in other transverse discharge laser configurations (whether AC, DC or pulsed) these plates merely represent the appropriate electrode configuration. In FIG. 2, parts 23C and 23D are dielectric pieces, such as ceramic. The surface of 23C and 23D which face the amplification volume are shown as 30C and 30D respectively. In this case, the discharge cavity is at least partly bounded by surfaces 30C, 30D, 21C and 22C. The electric field is perpendicular to surfaces 21C and 22C.

From limited experiments, it appears as if the precious metal catalyst works best if placed on dielectric surfaces, such as, 30C and 30D. In FIG. 2, surface 30C is visible and illustrated by small dots which represent microscopically divided precious metal catalyst similar to 30A in FIG. 1. In an RF waveguide, such as depicted in FIG. 2, it is possible to place a dielectric material, such as a thin ceramic sheet, covering the portion of metal electrode 21C facing electrode 22C. The dielectric material would transmit the AC power. The precious metal catalyst could be applied to the surface of the dielectric materials facing the discharge, thereby, providing a coated wall similar to 30C or 30D.

The RF excited waveguide depicted in FIG. 2 differs from the longitudinal discharge depicted in FIG. 1, inasmuch as the spacing between electrodes in FIG. 2 can be a dimension as small or smaller than the size of a single electrically isolated island, such as 30L in FIG. 1. If the voltage gradient between electrodes in an RF excited laser is less than 450 volts, then the requirement for the precious metal catalyst becomes merely one of providing at least one break, such that an electrical discharge can be established in the gas mixture. This is to say that the precious metal cannot create a short circuit between cathode and anode. Those skilled in the art will realize that high frequency (RF) excitation differs from DC inasmuch as it is even possible to construct a geometry which has a DC electrical connection, but at RF frequencies, there is an effective break which provides sufficient isolation between electrodes to permit the establishment of a discharge.

If AC or RF electrical power is used to excite any discharge, the relative polarity of electrodes, such as 21C and 22C in FIG. 2 is changing with time. However, it is possible to refer to these as a cathode and an anode because, for an instant in time, one surface is negative and the other surface positive. Therefore, in this text, reference to terms "cathode" and "anode" will be used even for AC configurations.

The theory of operation of the "Precious Metal Coated Carbon Monoxide Laser" is not fully understood. Presently, the prior art teaches that carbon dioxide is undesirable in a carbon monoxide laser. Carbon dioxide is known to have energy levels which would compete with carbon monoxide for energy. This would, theoretically, have the effect of lowering the laser power for carbon monoxide. The presence of the precious metal catalyst actually increases the concentration of the carbon dioxide in the carbon monoxide gas mixture while reducing the amount of $O_2$. This would appear to be, therefore, the exact opposite of the desired result. However, from experiments, it appears that encouraging the formation of carbon dioxide is the lesser of two evils. Otherwise, the discharge contains greater amounts of $O$, $O_3$, $NO$, and $NO_2$ which may actually be more detrimental than the presence of carbon dioxide.

Some of the precious metals, such as gold, exhibit catalytic affects which specifically eliminate oxides of nitrogen by eliminating $NO$, the first step in the formation of the other oxides. The oxides of nitrogen, particularly $NO_2$, destabilizes discharges. The CO laser is very sensitive to discharge instabilities; therefore, a major beneficial effect may be the elimination of the oxides of nitrogen. Another probable result is a reduction in the amount of atomic oxygen compared to a CO laser without a precious metal catalyst. Besides forming $CO_2$, the precious metal catalyst would eliminate atomic oxygen by also forming $O_2$. Atomic oxygen is known to deactivate vibrationally excited nitrogen.

This author has observed that a carbon monoxide laser gas mixture, run in the presence a gold catalyst coated wall, exhibits improved discharge stability compared to a similar discharge configuration without the gold catalyst. This improved discharge stability should translate into more efficient excitation of the carbon monoxide molecule. Also, it has been found that, with the presence of the gold catalyst, the discharge is stable at lower concentrations of oxygen bearing gas. This is to say that the oxygen can be introduced either as $O_2$ or as $CO_2$. The total number of oxygen atoms, in excess of the stoichiometric carbon monoxide composition can be minimized with the presence of the gold catalyst. Previous tests have shown that other precious metals (silver, platinum, palladium, rhodium and iridium may have similar chemical effects, but gold is the preferred material.

The improved laser design for a carbon monoxide laser also includes three benefits obtained by coating the walls of a carbon monoxide laser with a reflecting material whether or not it also performs a catalytic function. The presence of a highly reflecting wall which does not exhibit electrical conductivity sufficient to deviate the discharge provides three possible benefits.

1. The reflecting walls minimize the diffraction loss for the laser resonance condition. This permits higher reflectivity output couplers to be used without the normal increase in losses due to diffraction. This produces more circulating laser power which, in turn, produces a more efficient energy extraction of the excited molecules. This ultimately allows a higher output power to be extracted when the optimum reflectivity mirrors are used.

2. The reflective walls effectively trap spontaneously emitted light. In a carbon monoxide laser, the lower vibrational states (V=1 to 4) are highly populated and can have a population distribution equivalent to a temperature of 10,000° K. These low level vibrational states do not lase but, instead, radiate away a considerable amount of power as spontaneous emission at wavelengths generally between 4.5 and 5.2 microns. If the walls of the laser discharge cavity are highly reflecting at this wavelength, this light is reflected back into the laser gas mixture where it can undergo reabsorption by the carbon monoxide. This reabsorption process effectively reduces one of the major sources of energy loss for the carbon monoxide laser. This should have the effect of increasing output power and the efficiency of the carbon monoxide laser.

3. If the CO laser discharge is surrounded by reflecting walls, this will increase the amount of visible light passing through the discharge because of radiation trapping by multiple reflections. This light will increase the probability of detaching electrons from negatively charged ions in the discharge. For example, O⁻ is one type of negative ion present in the discharge. Light with a wavelength shorter than 8000 angstroms can detach an electron from the above ion. This detachment improves the ability of the discharge to efficiently excite the CO molecule. Increasing the strength of light with a wavelength between 300 and 800 nanometers passing through the discharge will decrease the number of negative ions in the discharge.

In the preferred embodiment, where the reflective walls are being used, the most desirable configuration would be to have the entire length of the cavity coated by the reflective surface. This is to say that, in FIG. 1, the tube 23A between reflectors 27 and 28 should also be coated with the reflecting surface to minimize losses in this region. In FIG. 1, the ring shaped pieces designated 30K, 30L, 30M are shown for clarity with gaps which are wider than the ideal in this situation. The preferred embodiment would be to minimize the width of these gaps. These reflecting metal islands would be electrically insulated from each other by the dielectric material supporting them. They would extend along the entire length of the laser cavity, so that the above mentioned optical losses would be minimized. It is to be understood that improvements would still be realized without achieving this ideal high degree of coverage.

In the configurations shown in FIG. 2, the dielectric walls, #30C and 30D are shown coated with a metal. In this configuration, the metal is depicted as finely divided particles. However, the preferred embodiment for achieving a reflective surface would be to have the particle sizes large enough to provide metallic specular reflection on all walls. The key here is to coat any dielectric walls in the cavity with a reflecting metal so that optical losses are minimized. It should be noted that the above mentioned totally reflective wall improvement could utilize any reflective metal, such as aluminum or copper, even though these materials do not also exhibit the additional beneficial effect of stabilizing the discharge as observed with the precious metals. However, the preferred embodiment would utilize the precious metals.

As previously mentioned, another embodiment is to coat the precious metal catalyst on the walls in a form which produces an absorbing surface. This minimizes wall reflection and encourages a free space mode. Precious metals sputtered at a gas pressure of several torr can be made to have absorbing surfaces using techniques known to those skilled in the art. Other deposition methods are also known to those skilled in the art. With the absorbing surface, the catalytic effect is the primary beneficial effect.

I claim:

1. A carbon monoxide laser apparatus including a closed envelope made of a material capable of maintaning a partial vacuum, said envelope containing a cavity filled with a laser gas mixture which includes carbon monoxide; said laser also having electrically powered electrode means for establising an electric field and a discharge through said laser gas mixture in said cavity, and optical means for directing a laser beam through said discharge and means for extracting at least a portion of said laser beam from said cavity producing an output laser beam, the improved feature comprising:

said cavity having at least one wall surface facing said discharge;

a substantial portion of said wall surface of said cavity consisting of a solid substrate material coated with a precious metal chosen from the group consisting of gold, silver, platinum, palladium, rhodium and iridium;

wherein said precious metal provides a catalytic action in said gas mixture which improves the power of said output laser beam.

2. The apparatus according to claim 1 wherein said solid substrate material is a dielectric material and said precious metal is configured to form multiple, electrically isolated islands on said substrate material.

3. The apparatus according to claim 2 wherein said precious metal is specularly reflecting.

4. The apparatus according to claim 2 wherein said isolated islands of said precious metal are generally of a microscopic size and are not specularly reflecting.

5. A CO laser device including a closed envelope containing a CO laser gas mixture and an amplification volume, said amplification volume including an electrical discharge through said CO laser gas mixture, said discharge causing formation of at least one detrimental gas from the group consisting of $O_3$, O, NO, and $NO_2$, the improved feature comprising:

said envelope bearing at least one inside surface at least partly composed of a precious metal chosen from the group consisting of gold, silver, platinum, palladium, rhodium and iridium;

said envelope inside surface being positioned and configured so as to promote contact with said CO laser gas mixture, such that there is a catalytic reaction which reduces the concentration of at least one of said detrimental gases.

6. A carbon monoxide laser apparatus including a closed envelope containing a cavity filled with a laser gas mixture which includes carbon monoxide; said laser also having electrically powered electrode means for establishing an electric field and a discharge through said laser gas mixture in said cavity, and optical means for directing a laser beam through said discharge and means for extracting at least a portion of said laser beam from said cavity producing an output laser beam, the improved feature comprising;

said cavity having at least one wall surface facing said discharge;

a substantial portion of said wall surface of said cavity consisting of a dielectric substrate material coated with a precious metal chosen from the group consisting of gold, silver, platinum, palladium, rhodium and iridium;

at least some portions of said wall surface of said cavity consisting of a dielectric substrate material coated with a precious metal chosen from the group consisting of gold, silver, platinum, palladium, rhodium and iridium;

at least in some portions of said cavity, said electric field is oriented to be generally parallel to said precious metal coated surface;

said precious metal coating being provided with breaks such that said precious metal forms multiple, electrically isolated islands;

said precious metal coating being highly reflecting at least at wavelengths between 4.5 and 5.2 microns and also at CO laser wavelengths.

* * * * *